US010644562B2

(12) United States Patent
Fukuzawa

(10) Patent No.: US 10,644,562 B2
(45) Date of Patent: May 5, 2020

(54) BLOWER DEVICE

(71) Applicant: SHINANO KENSHI CO., LTD., Ueda, Nagano (JP)

(72) Inventor: Akihito Fukuzawa, Nagano (JP)

(73) Assignee: SHINANO KENSHI CO., LTD., Ueda (JP)

(*) Notice: Subject to any disclaimer, the term of this patent is extended or adjusted under 35 U.S.C. 154(b) by 141 days.

(21) Appl. No.: 16/100,643

(22) Filed: Aug. 10, 2018

(65) Prior Publication Data

US 2019/0081527 A1 Mar. 14, 2019

(30) Foreign Application Priority Data

Sep. 13, 2017 (JP) ................. 2017-176207

(51) Int. Cl.
*H02K 5/10* (2006.01)
*F04D 25/06* (2006.01)
(Continued)

(52) U.S. Cl.
CPC ............. *H02K 5/10* (2013.01); *F04D 25/06* (2013.01); *F04D 25/0613* (2013.01); *F04D 25/0693* (2013.01); *F04D 29/083* (2013.01); *H02K 5/20* (2013.01); *H02K 5/225* (2013.01); *H02K 5/24* (2013.01); *H02K 7/14* (2013.01); *H02K 9/06* (2013.01); *H02K 11/30* (2016.01); *H02K 21/22* (2013.01); *F04D 29/403* (2013.01); *F04D 29/5813* (2013.01); *H02K 2205/09* (2013.01); *H02K 2211/03* (2013.01)

(58) Field of Classification Search
CPC .. H02K 9/00; H02K 9/06; H02K 9/08; H02K 9/083; H02K 5/00; H02K 5/10; H02K 5/16; H02K 5/161; H02K 5/167; H02K 5/1675; H02K 5/20; H02K 5/24; H02K 5/27; H02K 5/22; H02K 5/225; H02K 7/00; H02K 7/14; H02K 29/00; H02K 29/08; H02K 11/00; H02K 11/33; F04D 25/00; F04D 25/06; F04D 25/061; F04D 25/0613; F04D 25/069; F04D 25/0693; F04D 29/00; F04D 29/08; F04D 29/083; F16C 23/00; F16C 23/04; F16C 33/00; F16C 33/10; F16C 33/103; F16C 33/74
See application file for complete search history.

(56) References Cited

U.S. PATENT DOCUMENTS 5,798,589 A 8/1998 Ohi et al.
6,121,700 A * 9/2000 Yamaguchi .......... H02K 5/1675
310/425

(Continued)

FOREIGN PATENT DOCUMENTS

JP 2002-112504 A 4/2002
JP 2002-252958 A 9/2002

OTHER PUBLICATIONS

Jan. 22, 2019 Extended Search Report issued in European Patent Application No. 18190534.0.

*Primary Examiner* — Tran N Nguyen
(74) *Attorney, Agent, or Firm* — Oliff PLC

(57) ABSTRACT

A blower device includes: a fan; a motor rotating the fan, and including: a stator; a coil; a housing supporting the stator; and a cover covering the stator and the coil; a case housing a printed circuit board electrically connected to the coil; a first elastic body; and a second elastic body.

6 Claims, 6 Drawing Sheets

(51) Int. Cl.
*H02K 5/20* (2006.01)
*H02K 5/22* (2006.01)
*H02K 5/24* (2006.01)
*H02K 7/14* (2006.01)
*H02K 11/30* (2016.01)
*H02K 21/22* (2006.01)
*H02K 9/06* (2006.01)
*F04D 29/08* (2006.01)
*F04D 29/40* (2006.01)
*F04D 29/58* (2006.01)

(56) References Cited

U.S. PATENT DOCUMENTS

| | | | |
|---|---|---|---|
| 6,236,126 B1 * | 5/2001 | Yagi | H02K 1/2786 310/156.26 |
| 2001/0052733 A1 | 12/2001 | Fujii et al. | |
| 2002/0117914 A1 | 8/2002 | Doi et al. | |
| 2006/0153677 A1 * | 7/2006 | Winkler | F04D 29/057 415/220 |
| 2016/0301278 A1 * | 10/2016 | Otsuka | H02K 5/10 |

* cited by examiner

BLOWER DEVICE

CROSS-REFERENCE TO RELATED APPLICATION

This application is based upon and claims the benefit of priority of the prior Japanese Patent Application No. 2017-176207, filed on Sep. 13, 2017, the entire contents of which are incorporated herein by reference.

BACKGROUND

(i) Technical Field

The present invention relates to a blower device.

(ii) Related Art

There is known a blower device in which a casing housing a stator is filled with a filler such as epoxy resin or the like (see, for example, Japanese Unexamined Patent Application Publication No. 2002-252958). This ensures waterproofness and dustproofness of the stator.

SUMMARY

According to an aspect of the present invention, there is provided a blower device including: a fan; a motor rotating the fan, and including: a stator; a coil; a housing supporting the stator; and a cover covering the stator and the coil; a case housing a printed circuit board electrically connected to the coil; a first elastic body; and a second elastic body, wherein the housing includes: a cylindrical portion supporting the stator at an outside of the cylindrical portion; and a flange portion facing the cover, a diameter of the flange portion being greater than that of the cylindrical portion, the case includes a peripheral wall portion, the peripheral wall portion defines a periphery of an opening receiving the housing such that the flange portion is positioned inside the case and that the cylindrical portion is positioned outside the case, the peripheral wall portion is positioned between the cover and the flange portion, the first elastic body is sandwiched between the cover and one surface of the peripheral wall portion, is compressed in an axial direction of the motor, and is formed into an annular shape, the second elastic body is sandwiched between the cover and the flange portion and between the flange portion and another surface of the peripheral wall portion, is compressed in the axial direction, and is formed into an annular shape, an outer diameter of the second elastic body is smaller than that of the first elastic body.

DETAILED DESCRIPTION

Figure 1:
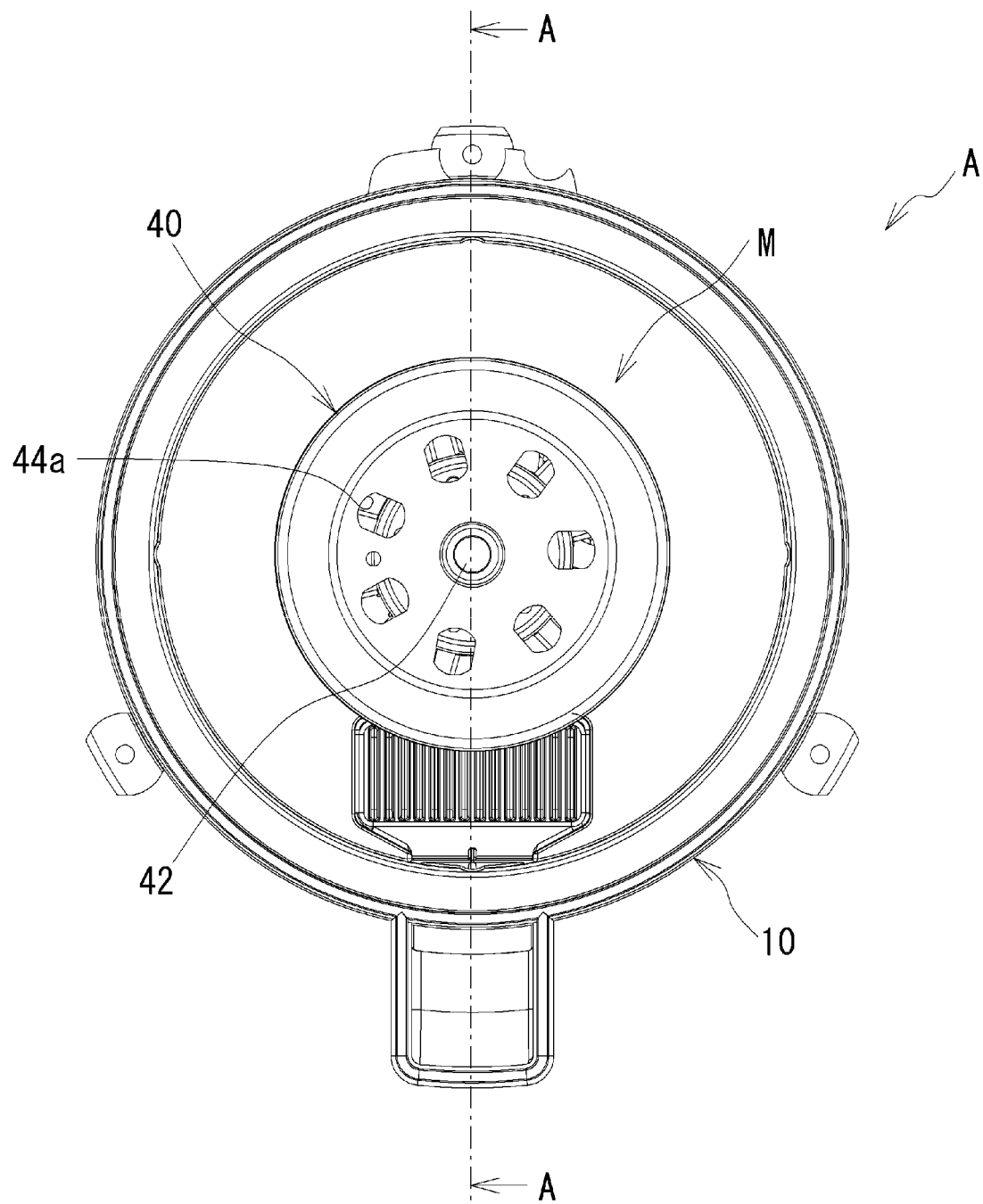
FIG. 1 is an external view of a blower device according to the present embodiment.
Figure 2:
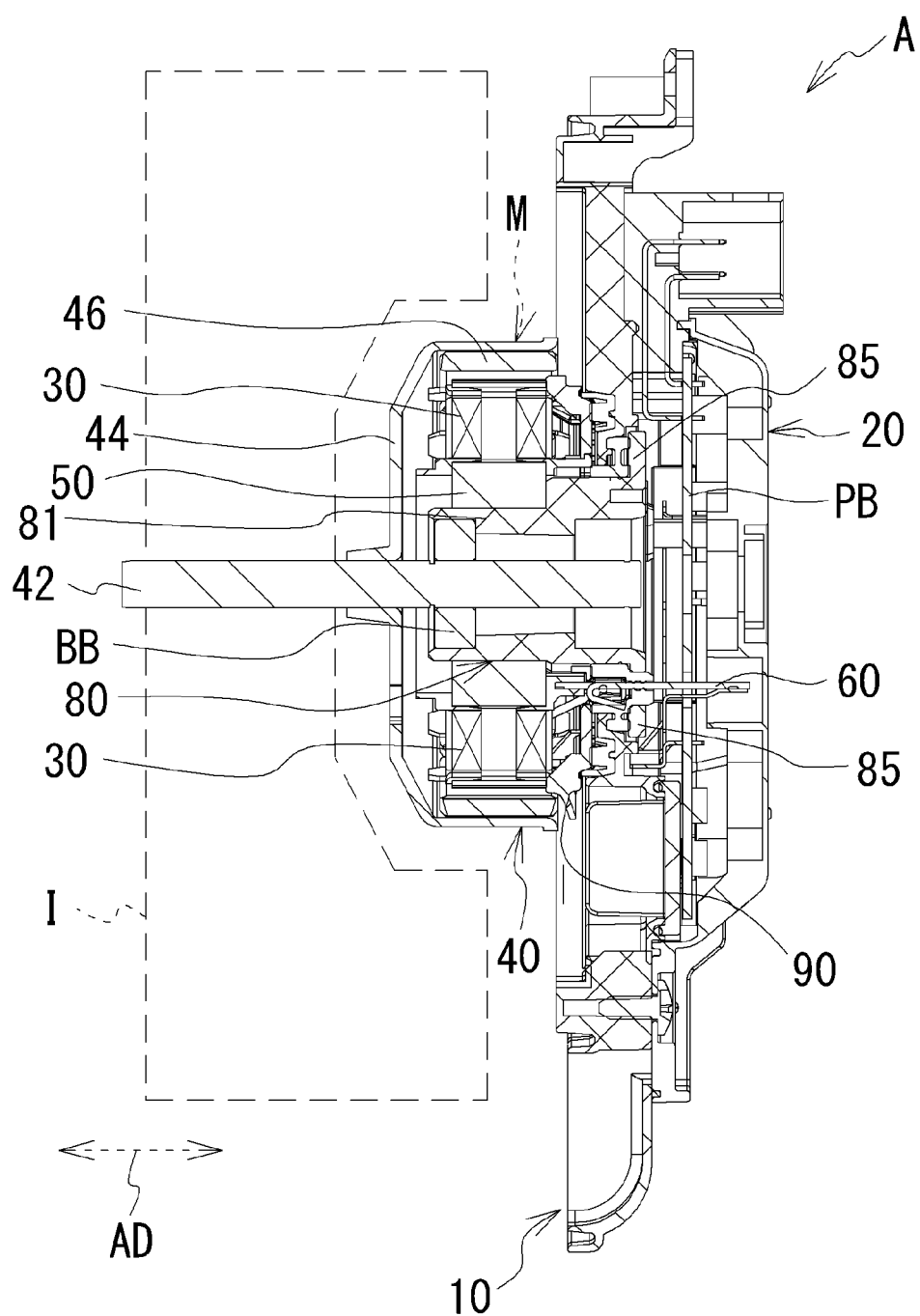
FIG. 2 is a cross-sectional view taken along line A-A of FIG. 1.
Figure 3:
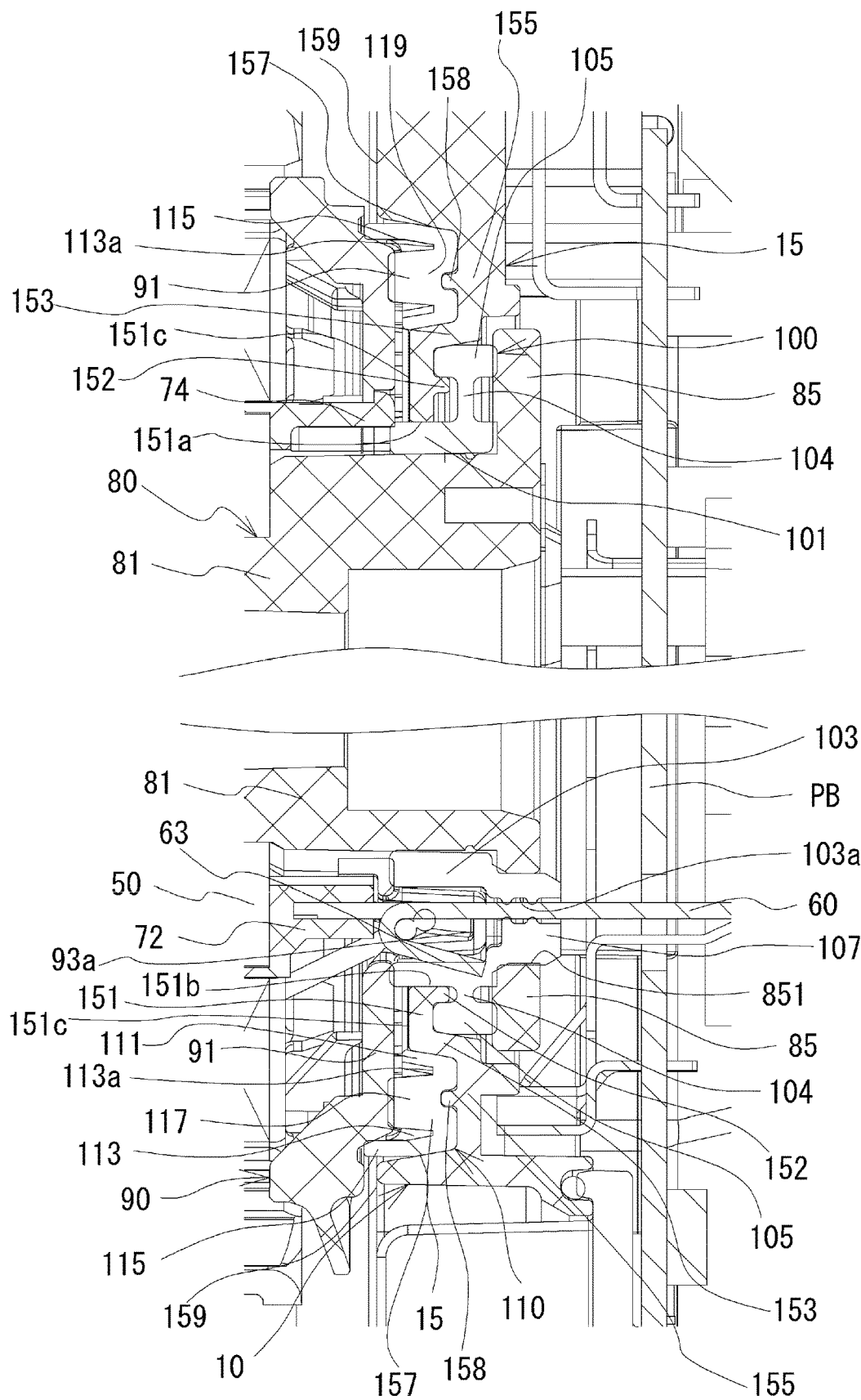
FIG. 3 is an enlarged view of FIG. 2.

FIG. 1 is an external view of a blower device A according to the present embodiment. FIG. 2 is a cross-sectional view taken along line A-A of FIG. 1. FIG. 3 is an enlarged view of FIG. 2. The blower device A includes cases 10 and 20, a motor M, a fan I rotated by the motor M, a printed circuit board PB electrically connected to the motor M, and the like. Additionally, the fan I is illustrated only in FIG. 2, and is omitted in the other drawings. The motor M and the fan I are positioned on one side with respect to the case 10. The case 20 is attached to the other side of the case 10. The cases 10 and 20, each formed into a semi-casing shape, are assembled into each other to house the printed circuit board PB. The cases 10 and 20 are made of, but not limited to, a synthetic resin, and may be made of a metal. Additionally, the case 10 exposes a heat sink 200 made of a metal and thermally connected to the printed circuit board PB. The heat sink 200 faces the fan I. The heat dissipation of the heat sink 200 is promoted by the rotation of the fan I, thereby ensuring the cooling property of the printed board PB.

The motor M will be described. As illustrated in FIG. 2, the motor M is positioned between the fan I and the case 10. The motor M includes coils 30, a rotor 40, a stator 50, terminals 60, a housing 80, a cover 90, and the like. The stator 50, made of a metal, will be described later in detail. The coils 30 are wound around respective teeth portions of the stator 50. The coils 30 are electrically connected to the printed circuit board PB via the terminals 60 which are not electrically connected to and is supported by the stator 50. Parts for controlling the energization states of the coils 30 are mounted on the printed circuit board PB. The cover 90 will be described later.

The rotor 40 includes a rotational shaft 42, a yoke 44, and one or more permanent magnets 46. The rotational shaft 42, penetrating through the housing 80, is rotatably supported. Specifically, the rotational shaft 42 is rotatably supported by a bearing B held in the housing 80. The yoke 44, made of a metal having a substantially cylindrical shape, is fixed to the rotational shaft 42 outside the housing 80. The housing 80 includes: a cylindrical portion 81 having a substantially cylindrical shape; and a flange portion 85 having a disk shape, having an outer diameter larger than that of the cylindrical portion 81, and positioned at an end portion of the cylindrical portion 81 near the printed circuit board PB. The flange portion 85 is formed with receiving holes through which the respective terminals 60 penetrate, as will be described later in detail. One or more permanent magnets 46 are fixed to an inner circumferential surface of the yoke 44. Additionally, the yoke 44 is provided with vent holes 44a around the rotational shaft 42, thereby promoting heat dissipation of the motor M. The permanent magnets 46 face an outer side of the teeth portions of the stator 50. When the coils 30 are energized to excite the teeth portions of the stator 50, the magnetic attractive force and the magnetic repulsive force are exerted between the permanent magnets 46 and the teeth portions, whereby the yoke 44, that is, the rotor 40 rotates relative to the stator 50. In such a manner, the motor M is an outer rotor type motor in which the rotor 40 rotates.

As illustrated in FIG. 3, an opening is formed substantially at the center of the case 10. The housing 80 is arranged to penetrate this opening. Specifically, the flange portion 85 of the housing 80 is positioned near the printed circuit board PB within the cases 10 and 20, and the cylindrical portion 81 is arranged to protrude outward from the opening. A rubber member 110 having a substantially annular shape is arranged between the cover 90 and a peripheral wall portion 15 of the case 10 positioned in the vicinity of the opening, and the rubber member 110 is compressed therebetween in the axial direction AD. A rubber member 100 having a substantially annular shape is arranged and compressed between the flange portion 85 of the housing 80 and the peripheral wall portion 15 and between the flange portion 85 and the cover 90 in the axial direction AD. The rubber member 100 is arranged substantially concentrically with the rubber member 110. An outer diameter of the rubber member 100 is smaller than that of the rubber member 110. The rubber member 110 is an example of a first elastic body. The rubber member 100 is an example of a second elastic body. These will be described later in detail.

The peripheral wall portion 15 of the case 10 will be described. The peripheral wall portion 15 is an area on the case 10 on which the cover 90 is projected from the axial direction AD. As illustrated in FIG. 3, the peripheral wall portion 15 includes an inner portion 151, a circumferential wall portion 153, and a lower wall portion 155 in this order from the radially inner side to the radially outer side. The inner portion 151 is formed into a thin and substantially annular shape surrounding the opening. The inner portion 151 includes: an inner edge surface 151a in contact with an inner circumferential wall portion 101 of the rubber member 100; and an inner edge surface 151b in contact with the seal portion 103 of the rubber member 100, which will be described later in detail. Each of the inner edge surfaces 151a and 151b defines an inner circumferential edge surface that has been continuously turned around. The inner edge surface 151b recedes radially outward from the inner edge surface 151a. Further, the inner portion 151 includes a facing surface 151c facing a disk portion 91 of the cover 90 described later. The inner portion 151 is provided, on its surface opposite to the facing surface 151c, with a protruding portion 152 continuous in the circumferential direction. The protruding portion 152 is in contact with an outer circumferential wall portion 105 of the rubber member 100 described later. The circumferential wall portion 153 has a substantially cylindrical shape protruding toward the flange portion 85 of the housing 80 from a radially outer end portion of the inner portion 151 in the substantially axial direction AD. The outer circumferential wall portion 105 of the rubber member 100 is in contact with a radially inner surface of the circumferential wall portion 153. A radially outer side of the circumferential wall portion 153 is in contact with the rubber member 110. The lower wall portion 155 having a substantially annular shape extends radially outward from an end portion, near the flange portion 85, of the circumferential wall portion 153. A surface of the lower wall portion 155 near the cover 90 is in contact with the rubber member 110. Herein, the circumferential wall portion 153 and the lower wall portion 155 define a depressed portion 157 which houses the rubber member 110 and is continuous in the circumferential direction. An outer surface 159 is formed radially outward from the lower wall portion 155 and near the fan I. The outer surface 159 is closer to the fan I than the facing surface 151c, faces the fan I, and is perpendicular to the axial direction AD.

Figure 4A:
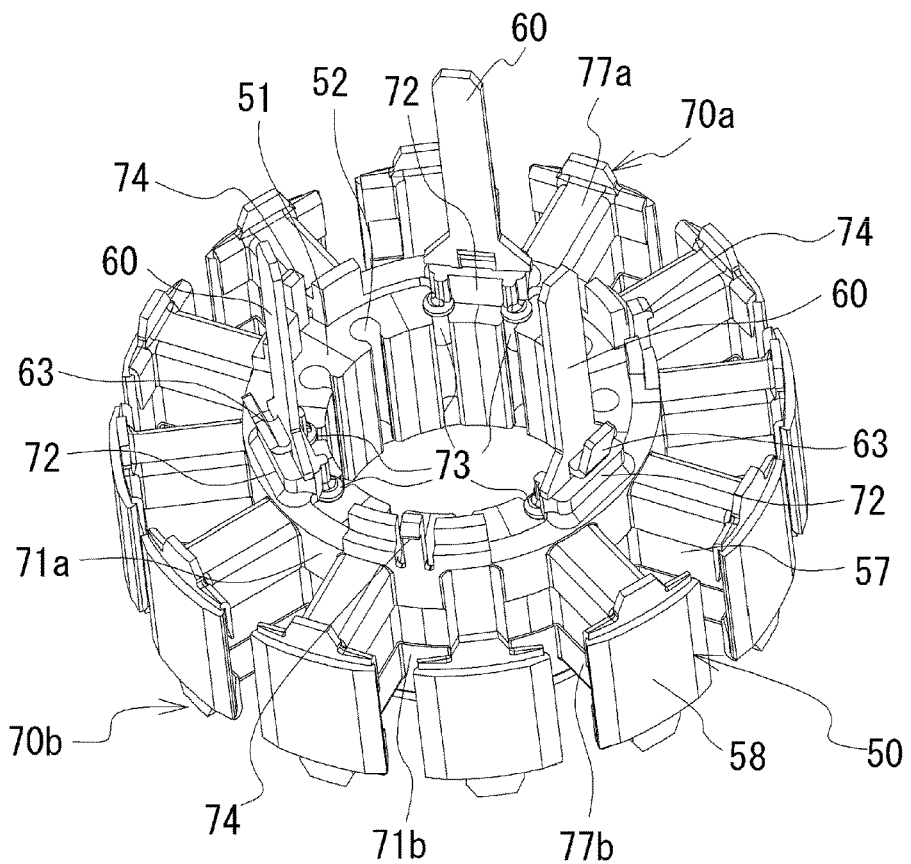
FIG. 4A is an explanatory view of a stator.

Next, a description will be given of the stator 50 and the cover 90. FIG. 4A is the stator 50. FIG. 4A illustrates the stator 50 into which insulators 70a and 70b are assembled. The three terminals 60 are assembled into the insulator 70a. The stator 50 includes an annular portion 51, teeth portions 57, and magnetic pole portions 58. The teeth portions 57 extend radially outward from the annular portion 51. The magnetic pole portions 58, formed at respective ends of the teeth portions 57, face the above-described permanent magnets 46. Grooves 52 are provided in the inner circumference of the annular portion 51.

Each of the insulators 70a and 70b is made of a synthetic resin having an insulating property. The insulator 70a is assembled into the stator 50 near the case 10. The insulator 70b is assembled into the stator 50 near the fan I. The insulator 70a includes an annular covering portion 71a and teeth covering portions 77a. The annular covering portion 71a is formed into a substantially annular shape so as to cover an outer circumferential side of an end portion, in the axial direction AD, of the annular portion 51 of the stator 50 and to cover a part of an outer circumferential surface of the annular portion 51. The teeth covering portions 77a, extending radially outward from the annular covering portion 71a, cover respective sides of the teeth portions 57 of the stator 50. As illustrated in FIG. 4A, the insulator 70b also includes an annular covering portion 71b and teeth covering portions 77b. Additionally, the insulators 70a and 70b expose the magnetic pole portions 58. Although not illustrated in FIG. 3, the coils 30 described above are wound around the respective teeth portions 57 of the stator 50 via the teeth covering portions 77a and 77b.

As illustrated in FIG. 4A, the annular covering portion 71a is provided with holding portions 72. The terminals 60 are held by the respective holding portions 72. Each holding portion 72 is provided with two engaging pins 73. The engaging pin 73 is fitted into the groove 52. As illustrated in FIG. 4A, the terminal 60 is formed with a bent portion 63 which is partially cut out and bent radially outward. A part of the coil 30 is pulled out and welded to the bent portion 63, and the coil 30 is electrically connected to the bent portion 63. In addition, the conduction way is not limited to this, and may be soldering, molting of the coating of the coil 30, or the like. As illustrated in FIG. 3, a distal end of the terminal 60 is electrically connected to the printed circuit board PB via a metal member.

As illustrated in FIG. 4A, the annular covering portion 71a is provided with three snap-fit claws 74 at substantially equal angular intervals. The snap-fit claw 74 is provided between the holding portions 72. The snap-fit claw 74 is engaged with the cover 90 described later, which fixes the cover 90 to the insulator 70a.

Figure 4B:
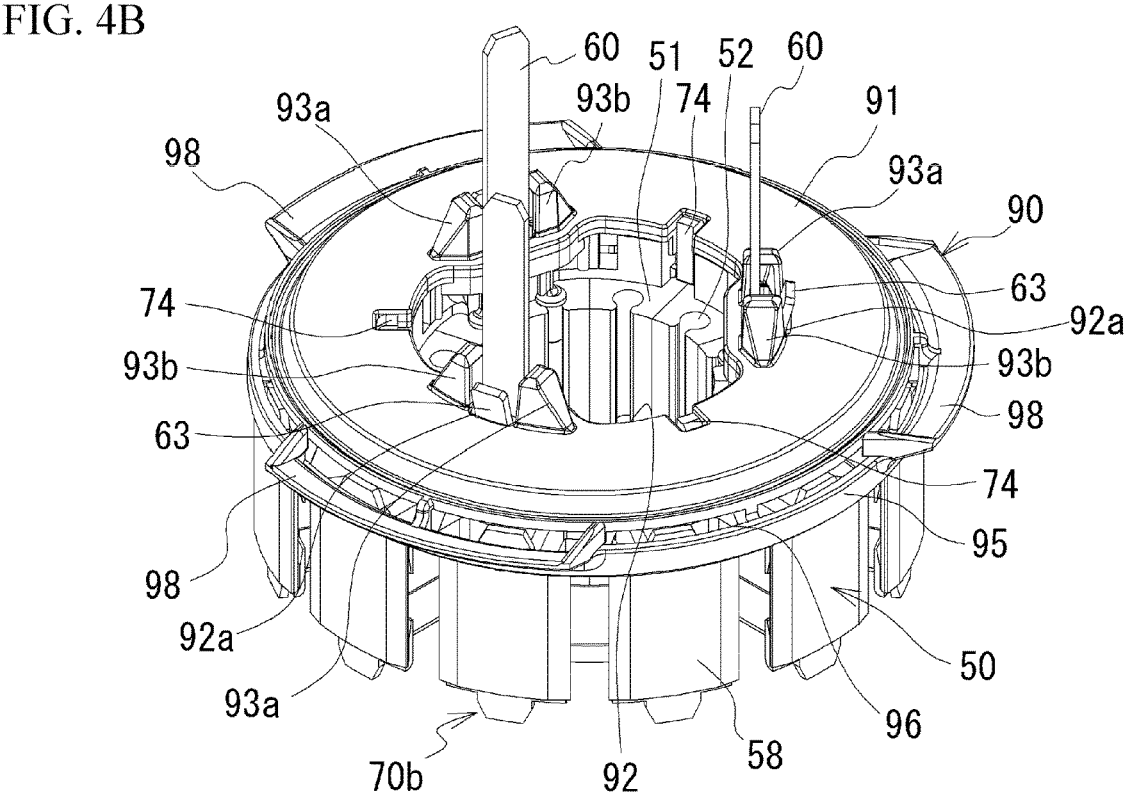
FIG. 4B is a view illustrating the stator to which a cover is attached.

FIG. 4B is a view illustrating the stator 50 to which the cover 90 is attached. The cover 90, made of a synthetic resin, includes the disk portion 91, a cylindrical portion 95, and blade portions 98. The disk portion 91 has a substantially disc shape having an opening portion 92 in the center. Further, the snap-fit claws 74 are engaged with the disk portion 91 in the vicinity of the opening portion 92. The cylindrical portion 95 is provided near the outer peripheral edge of the disk portion 91. The blade portions 98 are provided in the cylindrical portion 95 and protrude radially outward. A vent hole 96 is formed on the outer periphery of the cylindrical portion 95, which ensure air permeability.

Through holes 92a from which the respective terminals 60 protrudes are formed around the opening portion 92. A part of the bent portion 63 also protrudes together with the terminal 60 from the through hole 92a. Protruding portions 93a and 93b are formed in the disk portion 91 in the vicinity of the through hole 92a. The protruding portions 93a and 93b are positioned to sandwich the terminal 60 in the width direction thereof. The protruding height of each of the protruding portions 93a and 93b from the disc portion 91 is lower than that of the terminal 60 therefrom.

Figure 5A:
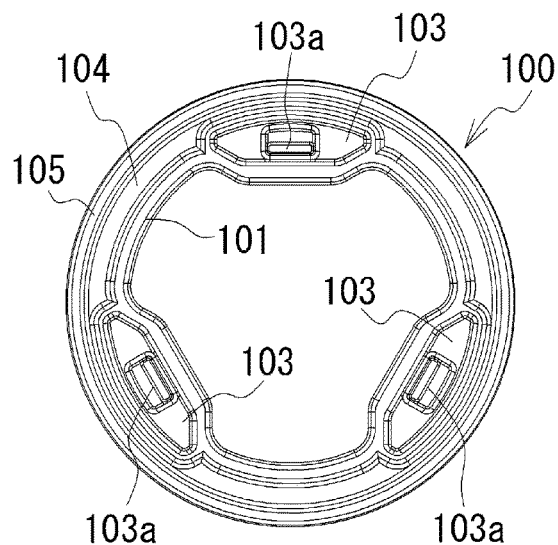
FIGS. 5A to 5D are external views of a rubber member.
Figure 5B:
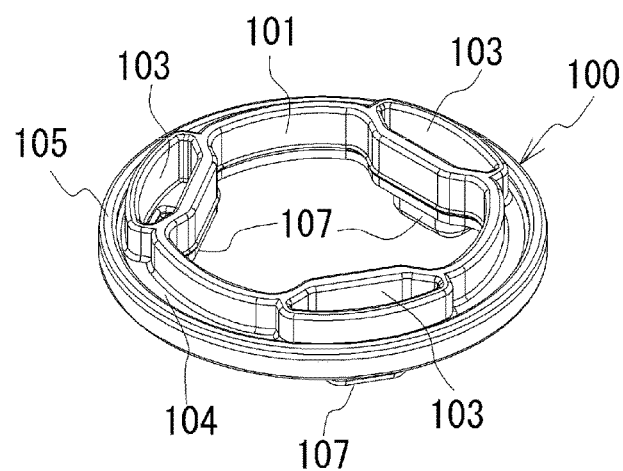
Figure 5C:
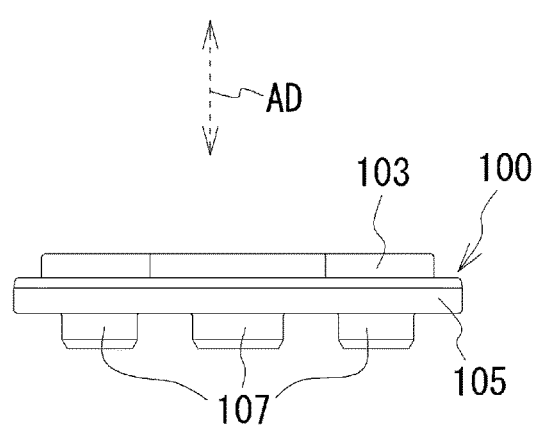
Figure 5D:
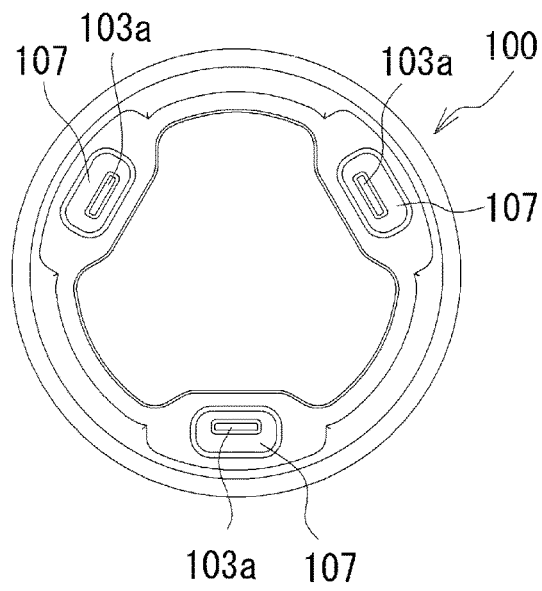

Next, the rubber member 100 will be described with reference to FIGS. 3, and 5A to 5D. FIGS. 5A to 5D are external views of the rubber member 100. FIG. 5A is a view of the rubber member 100 when viewed from its side attached to the cover 90. FIG. 5D is a view of the rubber member 100 when viewed from the opposite side. The rubber member 100 is formed into a substantially annular shape. The rubber member 100 includes an inner circumferential wall portion 101, a connection portion 104, the outer circumferential wall portion 105, seal portions 103, and seal portions 107. The outer circumferential wall portion 105, defining the outer circumferential portion of the rubber member 100, has a substantially cylindrical shape. The inner circumferential wall portion 101 defines the inner circumferential portion of the rubber member 100. The connecting portion 104, connecting the inner circumferential wall portion 101 and the outer circumferential wall portion 105, is arranged therebetween. A thickness of the connecting portion 104 in the axial direction AD is smaller than of each thickness of the inner circumferential wall portion 101 and the outer circumferential wall portion 105. The three seal portions 103 are formed continuously with the inner circumferential wall portion 101 at equal angular intervals. As illustrated in FIG. 5A, the seal portion 103 has a long groove shape whose longitudinal direction is the tangential direction of the rubber member 100 in the circumferential direction. The seal portion 103 protrudes inward from the inner circumferential wall portion 101. The inner edge surfaces 151a and 151b of the peripheral wall portion 15 correspond to the inner circumferential wall portion 101 and the seal portion 103, respectively. The seal portion 103 is formed at its bottom with a through hole 103a. The through hole 103a, through which the terminal 60 penetrates, has a slit shape and extends in the axial direction AD. As illustrated in FIG. 3, the rubber member 100 is fitted onto the outer circumferential surface of the flange portion 85 side of the cylindrical portion 81 of the housing 80. Specifically, the inner circumferential wall portion 101 and the inner peripheral side of the seal portion 103 are in contact with the outer circumferential surface of the cylindrical portion 81. That is, the shape of the outer circumferential surface, close to the flange portion 85, of the cylindrical portion 81 is complementary to the shape of the inner circumference of the rubber member 100.

The seal portion 107, formed continuously from the seal portion 103 in the axial direction AD, protrudes toward the side opposite to the side of the rubber member 100 attached to the cover 90. As illustrated in FIG. 5A, the seal portion 103 has a shape whose longitudinal direction is the tangential direction of the rubber member 100 in the circumferential direction. As illustrated in FIG. 5C, the seal portions 103 and 107 are aligned in the axial direction AD, in other words, in the direction in which the terminal 60 extends. A length of the seal portion 107 in the circumferential direction of the rubber member 100 is smaller than that of the seal portion 103. Therefore, as illustrated in FIG. 3, the seal portions 103 and 107 as a whole are formed into a substantially tubular shape including a step portion.

As illustrated in FIG. 3, the seal portion 103 surrounds a part of the terminal 60, the bent portion 63, the through hole 92a, and the protruding portions 93a and 93b. Further, the seal portion 107, inserted into a receiving hole 851 of the flange portion 85 of the housing 80, surrounds a part of the terminal 60. Therefore, the terminal 60 and the bent portion 63 are suppressed from coming into contact with other members, and insulation is ensured. This ensures dustproofness and waterproofness of the terminal 60 and the bent portion 63. This also suppresses vibration of the terminal 60. The protruding portions 93a and 93b function as spacers for suppressing deformation of the seal portion 103 and for maintaining a desired shape thereof.

As illustrated in FIG. 3, the inner circumferential wall portion 101 and the seal portion 103 are compressed between the flange portion 85 of the housing 80 and the disk portion 91 of the cover 90 in the axial direction AD. Further, the inner circumferential wall portion 101 is sandwiched between the outer circumferential surface of the cylindrical portion 81 and the inner edge surface 151a in the radial direction. Further, the inner wall of the seal portion 103 is in contact with the outer circumferential surface of the cylindrical portion 81, and the outer wall of the seal portion 103 is in contact with the inner edge surface 151b. This suppresses an increase in the deformation amount in the radial direction when the inner circumferential wall portion 101 and the seal portion 103 are compressed in the axial direction AD. As a result, strong elastic restoring force of the inner circumferential wall portion 101 and the seal portion 103 exerts between the cover 90 and the flange portion 85 in the axial direction AD, thereby ensuring waterproofness and dustproofness. Further, the inner circumferential wall portion 101 is sandwiched between the outer circumferential surface of the cylindrical portion 81 and the inner edge surface 151a in the radial direction as described above, whereby the inner circumferential wall portion 101 effectively absorbs vibration transmitted from the housing 80 to the case 10, specifically, vibration of the housing 80 in the radial direction due to the rotation of the rotor 40. This suppresses vibration from being transmitted to the case 10. An end portion of the inner circumferential wall portion 101 near the fan I protrudes toward the cover 90 from the facing surface 151c and blocks the space between the disk portion 91 of the cover 90 and the facing surface 151c. This suppresses dust, water and the like from entering the inside through a gap between the disk portion 91 and the facing surface 151c.

Likewise, the outer circumferential wall portion 105 is compressed between the inner portion 151 and the flange portion 85 in the axial direction AD, a part of the inner surface of the outer circumferential wall portion 105 is in contact with the protruding portion 152, and the outer surface of the outer circumferential wall portion 105 is in contact with the circumferential wall portion 153. This suppresses an increase in the deformation amount in the radial direction when the outer circumferential wall portion 105 is compressed in the axial direction AD. As a result, strong elastic restoring force of the outer circumferential wall portion 105 exerts between the inner portion 151 and the flange portion 85 in the axial direction AD, thereby ensuring waterproofness and dustproofness. Further, the outer circumferential wall portion 105 is sandwiched between the inner portion 151 and the flange portion 85 in the axial direction AD, whereby the outer circumferential wall portion 105 effectively absorbs vibration transmitted from the housing 80 to the peripheral wall portion 15 of the case 10, specifically, vibration of the housing 80 in the radial direction due to the rotation of the rotor 40.

Figure 6A:
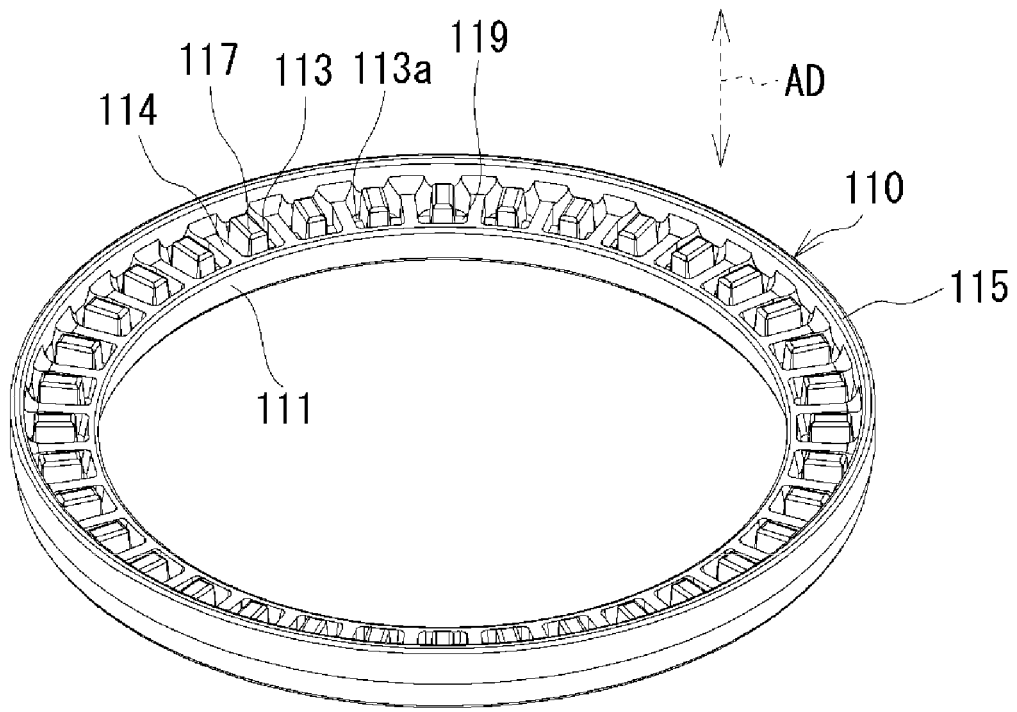
FIG. 6A is an external view of a rubber member.
Figure 6B:
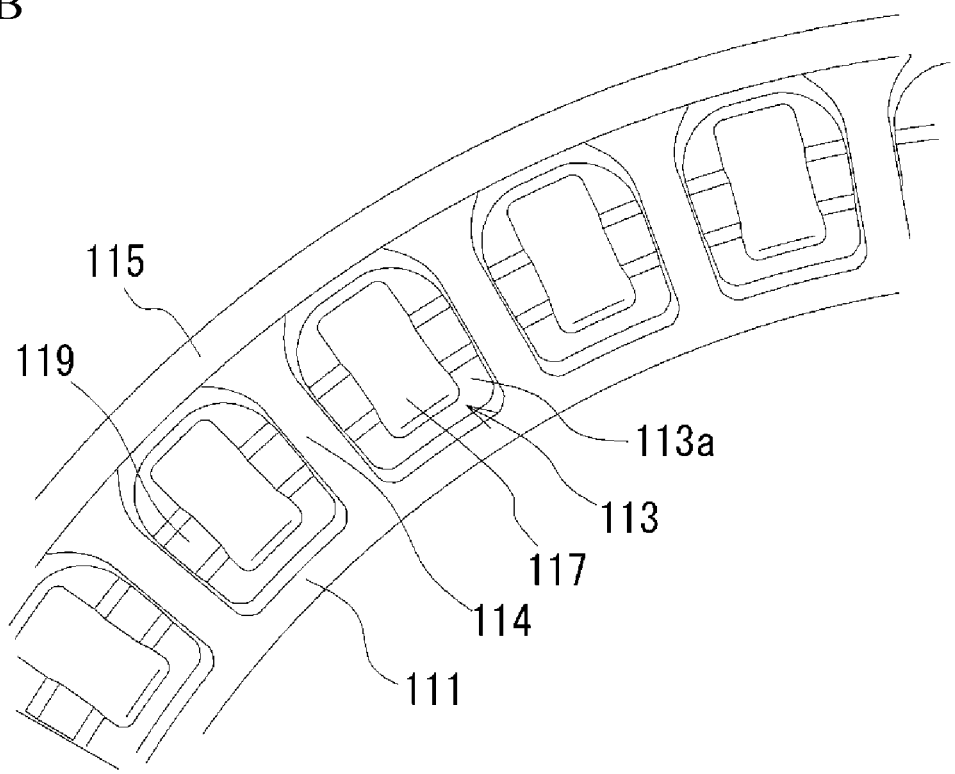
FIG. 6B is a partially enlarged view of the rubber member when viewed in an axial direction.

Next, the rubber member 110 will be described with reference to FIGS. 3, 6A and 6B. FIG. 6A is an external view of the rubber member 110. FIG. 6B is a partially enlarged view of the rubber member 110 when viewed in the axial direction AD. The rubber member 110 is formed into a substantially annular shape. The rubber member 110 includes an inner circumferential wall portion 111, connecting portions 114, an outer circumferential wall portion 115, recessed portions 113, and protruding portions 117. The outer circumferential wall portion 115 defines the outer circumferential portion of the rubber member 110, and is formed into a substantially cylindrical shape. The inner circumferential wall portion 111 defines the inner circumferential portion of the rubber member 110. The connecting portion 114 is positioned between the inner circumferential wall portion 111 and the outer circumferential wall portion 115, and extends in the radial direction to connect therebetween. The connecting portions 114 are provided radially. Although the inner circumferential wall portion 111 and the connecting portion 114 are substantially the same in thickness in the axial direction AD, the thickness of the outer circumferential wall portion 115 in the axial direction AD is greater than each thickness of the inner circumferential wall portion 111 and the connecting portion 114. The recessed portion 113 is defined by the inner circumferential wall portion 111, two adjacent connecting portions 114, and the outer circumferential wall portion 115. The recessed portion 113 includes a bottom surface 113a, and a height thereof is lower than each height of other portions. The recessed portion 113 are formed at equal angular intervals in the circumferential direction. Each of the recessed portion 113 is provided with the protruding portion 117 formed into a substantially rectangular parallelepiped shape protruding from the bottom surface 113a.

The protruding portions 117 are provided at predetermined intervals in the circumferential direction. Therefore, the protruding portion 117 is easily elastically deformed in the circumferential direction, as compared with, for example, a circumferential wall portion continuous in the circumferential direction. Further, as illustrated in FIG. 6B, the protruding portion 117 is formed into a substantially rectangular shape in which a length thereof in the circumferential direction is shorter than a length thereof in the radial direction when viewed in the axial direction AD. Also with this configuration, the elastic deformation is easier in the circumferential direction than in the radial direction. Additionally, the thickness of the protruding portion 117 in the axial direction AD is greater than each thickness of the inner circumferential wall portion 111 and the connection portion 114, and is smaller than the thickness of the outer circumferential wall portion 115.

The rubber member 110 is formed with an engaging portion 119 extending in the circumferential direction. As illustrated in FIG. 6B, the engaging portion 119 protrudes within the recessed portion 113 from the bottom surface 113a of the recessed portion 113. However, as illustrated in FIG. 3, the engaging portion 119 is formed into a concave shape on the reverse side of the bottom surface 113a. As illustrated in FIG. 3, the engaging portion 119 is engaged with a protrusion 158 provided on a bottom surface of the depressed portion 157 of the case 10 and continuous in the circumferential direction. Thus, the rubber member 110 is positioned with respect to the peripheral wall portion 15 of the case 10. Additionally, as illustrated in FIGS. 6A and 6B, the projecting height of the engaging portion 119 from the bottom surface 113a is lower than that of the protruding portion 117.

As illustrated in FIG. 3, the outer circumferential wall portion 115 and the protruding portions 117 are compressed between the lower wall portion 155 of the peripheral wall portion 15 and the disk portion 91 of the cover 90 in the axial direction AD. This suppresses vibration caused by the rotation of the rotor 40 from being transmitted to the case 10 via the cover 90. Further, the outer circumferential wall portion 115 protrudes further toward the cover 90 than the outer surface 159 of the case 10 and is in contact with the entire outer peripheral edge of the disk portion 91. This suppresses dust and water from entering the inside of the rubber member 110 from the outside thereof. Furthermore, the protruding portion 117 is formed in such a shape as to facilitate its elastic deformation in the circumferential direction as described above, thereby efficiently absorbing vibration in the circumferential direction due to the rotation of the rotor 40.

As described above, the rubber members 100 and 110 ensure dustproofness, waterproofness, and vibration-poofness. Even when external impact is applied to the case 10 or the like, the rubber members 100 and 110 suppress the impact transmitted to the motor M, and the impact resistance is ensured. Further, as compared with a case where a liquid filler such as epoxy resin instead of the rubber members 100 and 110 is filled in a predetermined space and is cured, the present embodiment eliminates the need for such filling work and curing work, which improves the assembly workability. In addition, the rubber members 100 and 110 are arranged so as to at least partially overlap with each other in the radial direction. For this reason, an increase in size in the axial direction AD of the blower device A is suppressed. As for the rubber members 100 and 110, a member made of a material having elasticity other than rubber may be used as long as the above-described use is satisfied.

The shape of the protruding portion 117 is not limited to the above-described shape, and the length in the circumferential direction and the length in the radial direction may be the same, or the length in the circumferential direction may greater than the length in the radial direction. Further, the protruding portion 117 may have a columnar shape or a tubular shape. Furthermore, the inner circumferential wall portion 111 is not contact with the disk portion 91 of the cover 90 in the present embodiment, but may be contact therewith.

While the exemplary embodiments of the present invention have been illustrated in detail, the present invention is not limited to the above-mentioned embodiments, and other embodiments, variations and modifications may be made without departing from the scope of the present invention.

What is claimed is:

1. A blower device comprising:
a fan;
a motor rotating the fan, and including: a stator; a coil; a housing supporting the stator; and a cover covering the stator and the coil;
a case housing a printed circuit board electrically connected to the coil;
a first elastic body; and
a second elastic body,
wherein
the housing includes:
  a cylindrical portion supporting the stator at an outside of the cylindrical portion; and
  a flange portion facing the cover, a diameter of the flange portion being greater than that of the cylindrical portion,
the case includes a peripheral wall portion,
the peripheral wall portion defines a periphery of an opening receiving the housing such that the flange portion is positioned inside the case and that the cylindrical portion is positioned outside the case,
the peripheral wall portion is positioned between the cover and the flange portion,
the first elastic body is sandwiched between the cover and one surface of the peripheral wall portion, is compressed in an axial direction of the motor, and is formed into an annular shape, the second elastic body is sandwiched between the cover and the flange portion and between the flange portion and another surface of the peripheral wall portion, is compressed in the axial direction, and is formed into an annular shape, an outer diameter of the second elastic body is smaller than that of the first elastic body.

2. The blower device of claim 1, wherein
the first elastic body includes an outer circumferential wall portion, and
the outer circumferential wall portion is in contact with an outer peripheral edge of the cover.

3. The blower device of claim 1, wherein
the first elastic body includes protruding portions, and
the protruding portions protrude in the axial direction, are in contact with the cover, and are arranged at intervals in a circumferential direction.

4. The blower device of claim 1, wherein
the second elastic body includes a through hole, and
a terminal electrically connecting between the coil and the printed circuit board penetrates through the through hole.

5. The blower device of claim 4, wherein
the flange portion includes a receiving hole,
the second elastic body includes a seal portion, and
the seal portion surrounds the terminal within the receiving hole.

6. The blower device of claim 1, wherein the first and second elastic bodies are arranged so as to at least partially overlap each other in a radial direction.

* * * * *